(12) United States Patent
Kato et al.

(10) Patent No.: US 9,074,675 B2
(45) Date of Patent: Jul. 7, 2015

(54) SHIFT DEVICE

(71) Applicant: Kabushiki Kaisha Tokai-Rika-Denki-Seisakusho, Aichi-ken (JP)

(72) Inventors: Masashi Kato, Aichi-ken (JP); Kenichi Kako, Aichi-ken (JP); Hayato Mori, Aichi-ken (JP); Kenji Nakanishi, Aichi-ken (JP); Reiji Higuchi, Aichi-ken (JP); Yoshifumi Iwasaki, Aichi-ken (JP); Kenta Goto, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 14/091,937

(22) Filed: Nov. 27, 2013

(65) Prior Publication Data
US 2014/0144274 A1 May 29, 2014

(30) Foreign Application Priority Data

Nov. 29, 2012 (JP) ................................. 2012-261497

(51) Int. Cl.
*F16H 59/10* (2006.01)
*F16H 59/02* (2006.01)

(52) U.S. Cl.
CPC ....... *F16H 59/0204* (2013.01); *Y10T 74/20159* (2015.01); *F16H 2059/0239* (2013.01)

(58) Field of Classification Search
CPC . F16H 59/10; F16H 61/22; F16H 2059/0282; F16H 63/3069; F16H 63/36; H02G 3/02; H02G 15/113

USPC ........... 74/473.21, 473.33; 200/177, 333, 339
See application file for complete search history.

(56) References Cited

U.S. PATENT DOCUMENTS

| | | | | |
|---|---|---|---|---|
| 1,424,809 | A * | 8/1922 | Donle | 200/557 |
| 4,732,232 | A * | 3/1988 | Miyagi et al. | 180/336 |
| 5,791,197 | A * | 8/1998 | Rempinski et al. | 74/473.18 |
| 5,845,535 | A * | 12/1998 | Wakabayashi et al. | 74/473.18 |
| 5,899,115 | A * | 5/1999 | Kataumi et al. | 74/473.18 |
| 6,237,435 | B1 * | 5/2001 | Gronhage et al. | 74/471 XY |
| 6,889,812 | B2 * | 5/2005 | Wendeberg et al. | 192/219.4 |
| 7,172,063 | B2 * | 2/2007 | Wendeberg et al. | 192/220.4 |
| 7,640,823 | B2 * | 1/2010 | Bowman et al. | 74/473.33 |

(Continued)

FOREIGN PATENT DOCUMENTS

| | | |
|---|---|---|
| JP | 2004-255969 A | 9/2004 |
| JP | 2005-119382 A | 5/2005 |

*Primary Examiner* — William Kelleher
*Assistant Examiner* — Valentin Craciun
(74) *Attorney, Agent, or Firm* — Roberts Mlotkowski Safran & Cole P.C.

(57) ABSTRACT

In a strength gate of a shift lever device, a shift hole is provided with an automatic transmission hole, a manual transmission hole, and a communication hole. The strength gate is provided with a peninsular portion that is adjacent to the automatic transmission hole, the manual transmission hole and the communication hole, and an opposing portion that is on the opposite side of the manual transmission hole to the peninsular portion. The peninsular portion is disposed to a front side with respect to the opposing portion. A reduction in the size of the peninsular portion along the vehicle left-right direction can accordingly be suppressed even if the strength gate is reduced in size along the vehicle left-right direction, thereby enabling a reduction in the strength of the peninsular portion to be suppressed.

2 Claims, 5 Drawing Sheets

(56) References Cited

U.S. PATENT DOCUMENTS

| | | | |
|---|---|---|---|
| 7,650,811 B2* | 1/2010 | Matsui et al. | 74/473.12 |
| 8,338,731 B2* | 12/2012 | Yu | 200/339 |
| 8,371,188 B2* | 2/2013 | Bortolon et al. | 74/473.21 |
| 2004/0079613 A1* | 4/2004 | Cho | 192/220.7 |
| 2005/0039562 A1* | 2/2005 | Kako et al. | 74/473.33 |
| 2005/0087033 A1* | 4/2005 | Chi | 74/473.33 |
| 2005/0193853 A1* | 9/2005 | Zelman | 74/473.18 |
| 2006/0053930 A1* | 3/2006 | Morita et al. | 74/473.18 |
| 2008/0098844 A1* | 5/2008 | Kato et al. | 74/473.18 |
| 2008/0098849 A1* | 5/2008 | Wang | 74/523 |
| 2010/0083784 A1* | 4/2010 | Bortolon et al. | 74/473.21 |
| 2010/0307277 A1* | 12/2010 | Ueta et al. | 74/473.34 |
| 2012/0067155 A1* | 3/2012 | Grosse Kohorst | 74/473.15 |
| 2012/0175233 A1* | 7/2012 | Yu | 200/345 |
| 2013/0215595 A1* | 8/2013 | Ujimoto et al. | 362/23.19 |
| 2014/0290421 A1* | 10/2014 | Baumer et al. | 74/491 |

* cited by examiner

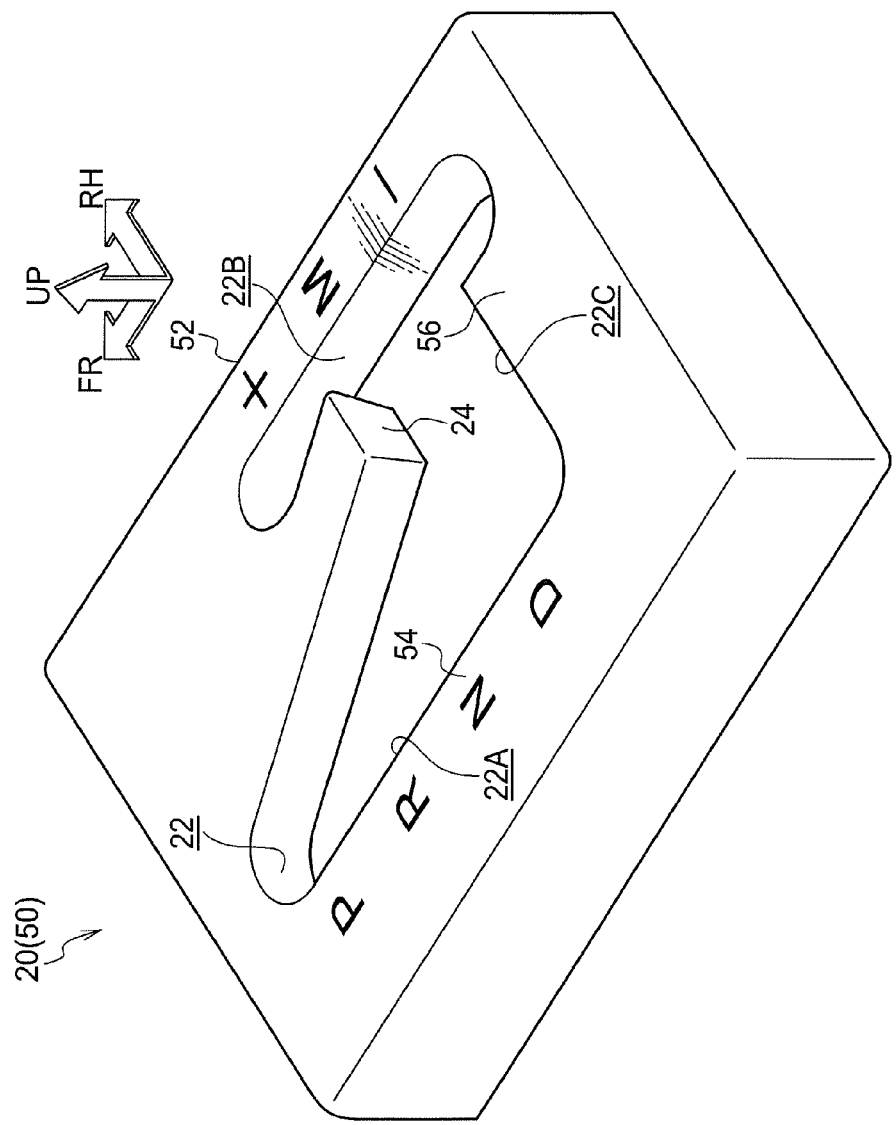

SHIFT DEVICE

CROSS-REFERENCE TO RELATED APPLICATION

This application claims priority under 35 USC 119 from Japanese Patent Application No. 2012-261497, filed Nov. 29, 2012, the disclosure of which is incorporated by reference herein.

BACKGROUND

1. Field of the Invention

The present invention relates to a shift device in which a shift member is turned to change a shift position.

2. Related Art

In a shift lever device described in Japanese Patent Application Laid-Open (JP-A) No. 2005-119382, a shift lever is inserted through a shift groove of a guide plate so as to be capable of turning, and the shift groove is provided with an automatic transmission mode selection area and a manual transmission mode selection area. In the shift groove, the automatic transmission mode selection area and the manual transmission mode selection area are placed in communication with each other by a communication area, and the guide plate is provided with an adjacent portion that is adjacent to the automatic transmission mode selection area, the manual transmission mode selection area, and the communication area.

However, in this shift lever device, sometimes it is necessary to reduce the size (reduce the scale) of the guide plate in the direction along the shift groove (along the in-plane direction of the guide plate). In such cases, the strength of the adjacent portion decreases if the adjacent portion is reduced in size along the shift groove direction when the reduction in size of the guide plate along the shift groove direction, so there is a possibility of the adjacent portion being unable to efficiently restrict turning of the shift lever.

SUMMARY

In consideration of the above circumstances, an object of the present invention is to obtain a shift device capable of suppressing a reduction in the strength of an adjacent portion even if a restriction member is reduced in size (reduced in scale) along the direction of a shift hole.

A shift device of a first aspect includes: a shift member that is turned to change a shift position; a restriction member, at a back side of which a turning center side of the shift member is disposed, and at which a shift hole is provided, the shift member being inserted through the shift hole so as to be capable of turning, a peripheral face of the shift hole being capable of restricting turning of the shift member, and the shift hole including a pair of first holes and a second hole that communicates the pair of first holes; an adjacent portion that is provided at the restriction member, and that is adjacent to the pair of first holes and to the second hole; and an opposing portion that is provided at the restriction member so as to be disposed at an opposite side of the shift hole from the adjacent portion, the adjacent portion being disposed at a front side with respect to the opposing portion.

A shift device of a second aspect is the shift device of the first aspect, wherein a back face of the adjacent portion is disposed at a front side with respect to a front face of the opposing portion.

In the shift device of the first aspect, the shift position is changed by turning the shift member.

The turning center side of the shift member is disposed at the back side of the restriction member, and the shift hole is provided at the restriction member. The shift member is inserted through the shift hole so as to be capable of turning, and the peripheral face of the shift hole is capable of restricting turning of the shift member. Moreover, the shift hole is provided with the pair of first holes and the second hole, with the pair of first holes being communicated by the second hole. At the restriction member, the adjacent portion and the opposing portion are provided. The adjacent portion is adjacent to the pair of first holes and to the second hole, and the opposing portion is disposed at the opposite side of the shift hole to the adjacent portion.

The adjacent portion is disposed at the front side with respect to the opposing portion. A reduction in size of the adjacent portion along the direction of the shift hole can accordingly be suppressed even if the restriction member is reduced in size along the direction of the shift hole, which is different in a case in which the position of the adjacent portion matches the position of the opposing portion in a front-back direction. A reduction in the strength of the adjacent portion can accordingly be suppressed.

In the shift device of the second aspect, the back face of the adjacent portion is disposed at the front side with respect to the front face of the opposing portion. A reduction in size of the adjacent portion along the direction of the shift hole can accordingly be efficiently suppressed even if the restriction member is reduced in size along the direction of the shift hole, thereby enabling a reduction in the strength of the adjacent portion to be efficiently and reliably suppressed.

BRIEF DESCRIPTION OF THE DRAWINGS

Embodiments of the invention will be described in detail with reference to the following figures, wherein:

FIG. 5 is a perspective view illustrating a strength gate of a shift lever device according to the second exemplary embodiment of the present invention, as viewed from the diagonal rear left of the vehicle.

DETAILED DESCRIPTION

First Exemplary Embodiment

Figure 1:
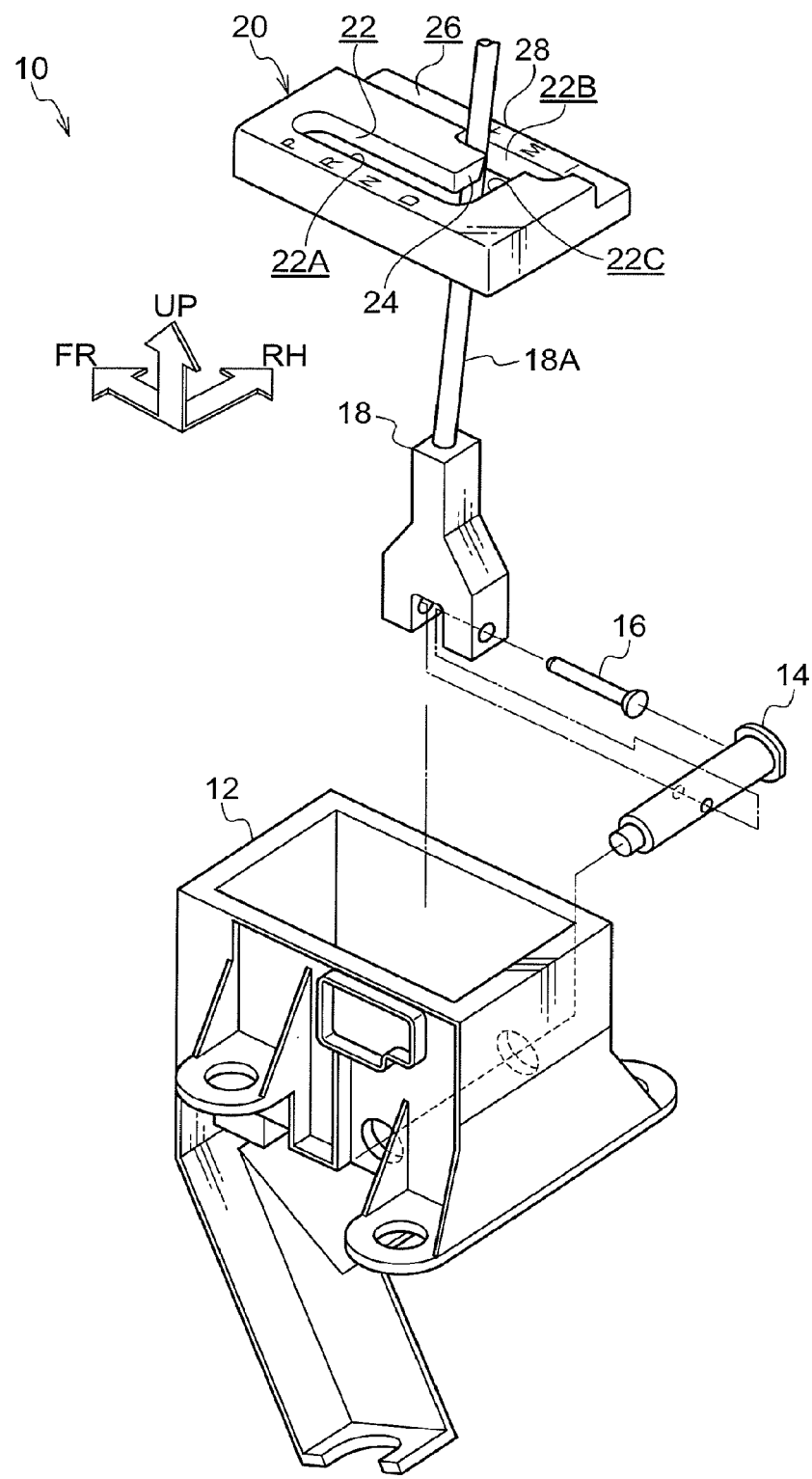
FIG. 1 is an exploded perspective view illustrating a shift lever device according to a first exemplary embodiment of the present invention, as viewed from the diagonal rear left of a vehicle.
Figure 2:
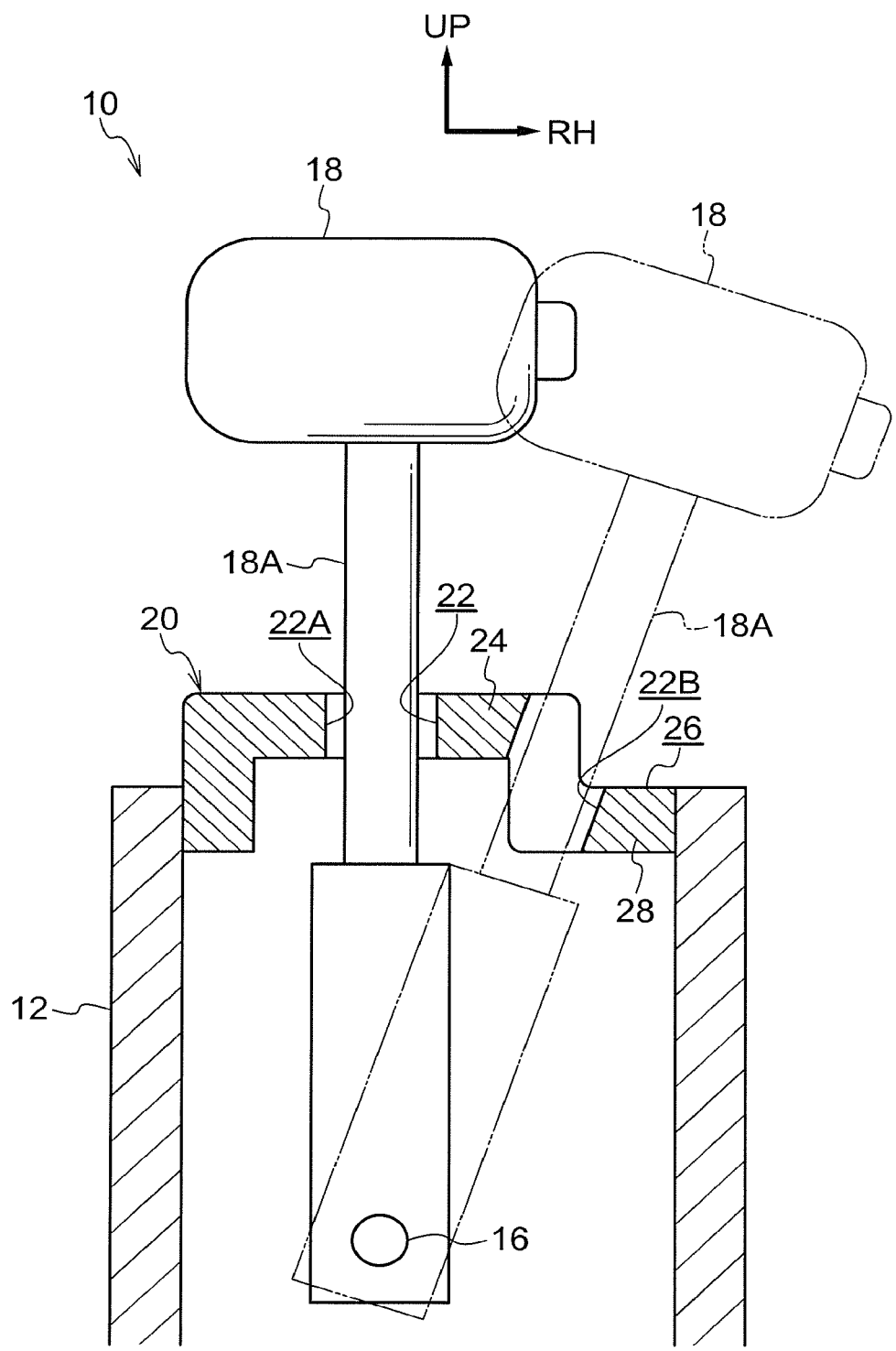
FIG. 2 is a cross-section illustrating a shift lever device according to the first exemplary embodiment of the present invention, as viewed from the vehicle rear.

FIG. 1 is an exploded perspective view illustrating a shift lever device 10 serving as a shift device of a first exemplary embodiment of the present invention, as viewed from the diagonal rear left of a vehicle. FIG. 2 is a cross-section illustrating the shift lever device 10, as viewed from the vehicle rear. Note that in the drawings, the vehicle front is indicated by the arrow FR, the right hand of the vehicle is indicated by the arrow RH, and the arrow UP indicates upwards.

The shift lever device 10 of the present exemplary embodiment is configured as what is referred to as a floor type, and is installed to a floor portion (floor) of a vehicle compartment that serves as a vehicle body side.

As illustrated in FIG. 1 and FIG. 2, the shift lever device 10 is provided with a substantially rectangular parallelopiped box shaped case 12 serving as a supporting member. The case 12 is fixed to the floor portion of the vehicle compartment, and is open at an upper face.

A circular shaft shaped shift shaft 14 serving as a first shaft is provided at a lower end inside the case 12. The shift shaft 14 is disposed with an axial direction thereof running parallel to the vehicle left-right direction (vehicle width direction), and is rotatably supported by a vehicle right side wall and a vehicle left side wall of the case 12. A circular shaft shaped selector shaft 16 serving as a second shaft is rotatably supported at the shift shaft 14. The selector shaft 16 is disposed with an axial direction thereof running along a radial direction of the shift shaft 14 (for example along the vehicle front-rear direction).

A lower end of a shift lever 18 is supported at the selector shaft 16. The shift lever 18 is configured so as to be capable of being operated to turn (rotate) along the vehicle front-rear direction (shift direction) about the shift shaft 14 as the center axis, and also so as to be capable of being operated to turn (rotate) along the vehicle left-right direction (select direction) about the selector shaft 16 as the center axis. A circular cylinder shaped lever 18A is provided at an upper side portion of the shift lever 18. The lever 18A is disposed with an axial direction thereof running along the turn radial direction of the shift lever 18.

A substantially rectangular parallelopiped box shaped strength gate 20 serving as a restriction member is fixed to an upper end inside the case 12. The strength gate 20 covers the upper face opening of the case 12. An upper wall of the strength gate 20 is configured in a flat plate shape, and the strength gate 20 is open at a lower face.

A shift hole 22 of a specific shape is formed penetrating the upper wall of the strength gate 20. The width of the shift hole 22 is configured slightly larger than the diameter of the lever 18A of the shift lever 18. The lever 18A is inserted through (penetrates) the shift hole 22 such that the shift lever 18 can be turned with the lever 18A being guided by the shift hole 22. The lever 18A is capable of abutting a peripheral face of the shift hole 22, and the strength gate 20 is capable of restricting turning of the shift lever 18 at the peripheral face of the shift hole 22. Overall the peripheral face of the shift hole 22 are disposed so as to be parallel to the lever 18A axial direction when the lever 18A is facing the peripheral face.

At a vehicle left side portion of the shift hole 22, an automatic transmission hole 22A serving as a first hole is provided, the automatic transmission hole 22A extending (elongating) along the vehicle front-rear direction. At a vehicle right side portion of the shift hole 22, a manual transmission hole 22B serving as a first hole is provided, the manual transmission hole 22B extending (elongating) along the vehicle front-rear direction. A communication hole 22C serving as a second hole is provided at the shift hole 22 between the automatic transmission hole 22A and the manual transmission hole 22B. The communication hole 22C extends (elongates) along the vehicle left-right direction and places a vehicle rear side end portion of the automatic transmission hole 22A in communication with a vehicle front-rear direction intermediate portion of the manual transmission hole 22B.

Figure 3:
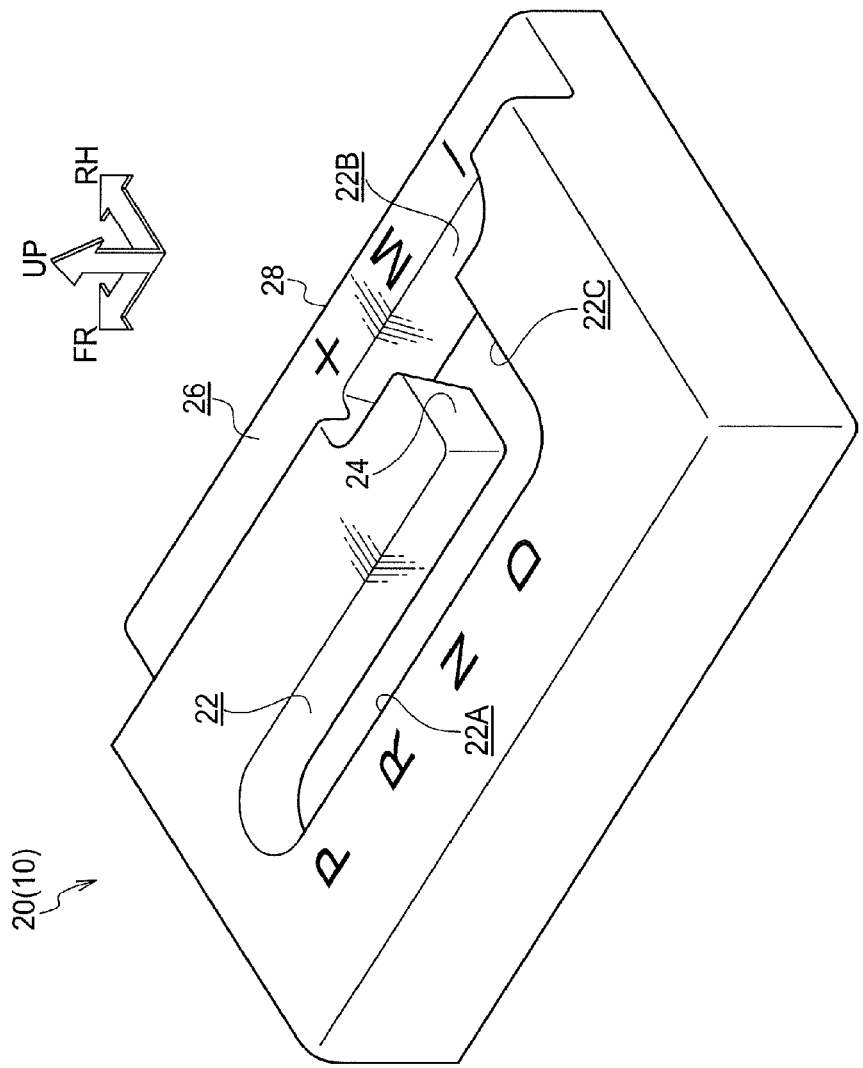
FIG. 3 is a perspective view illustrating a strength gate of a shift lever device according to the first exemplary embodiment of the present invention, as viewed from the diagonal rear left of the vehicle.

As illustrated in FIG. 3, when the shift lever 18 (the lever 18A) is turned along the automatic transmission hole 22A, the shift position of the shift lever 18 changes in sequence from the vehicle front side towards the vehicle rear side a "P" position (parking position), an "R" position (reverse position), an "N" position (neutral position), and a "D" position (drive position). Moreover, when the shift lever 18 (lever 18A) is turned along, from the automatic transmission hole 22A to the communication hole 22C, and then along the manual transmission hole 22B, the shift position of the shift lever 18 changes in sequence from the vehicle front side towards the vehicle rear side a "+" position (plus position), an "M" position (manual position, sequential position), and a "−" position (minus position).

The shift lever 18 is communicated with a vehicle automatic transmission (not illustrated in the drawings). When the shift position of the shift lever 18 is changed to the "P" position, the "R" position, the "N" position and the "D" position, the shift range of the automatic transmission is respectively changed to a "P" range (parking range), an "R" range (reverse range), an "N" range (neutral range), and a "D" range (drive range). Moreover, when the shift position of the shift lever 18 is changed to the "M" position, the shift range of the automatic transmission is changed to an "M" range (manual range, sequential range). The gear range is then raised by one step at a time by changing the shift position of the shift lever 18 from the "M" position to the "++" position, and the gear range of the automatic transmission is lowered by one step at a time by changing the shift position of the shift lever 18 from the "M" position to the "−" position.

As illustrated in FIG. 2 and FIG. 3, at the upper wall of the strength gate 20, a peninsular portion 24, serving as an adjacent portion, is provided between the vicinity of the vehicle rear side end portion of the automatic transmission hole 22A and a vehicle front side portion of the manual transmission hole 22B, and at the vehicle front side of the communication hole 22C. The peninsular portion 24 is adjacent to the automatic transmission hole 22A, the manual transmission hole 22B and the communication hole 22C.

A corner portion on the vehicle right side and at the upper side of the strength gate 20 is formed with a recessed portion 26 of rectangular cross-section profile along the overall strength gate 20 in the vehicle front-rear direction. The recessed portion 26 is open towards the vehicle right side and towards the upper side. The recessed portion 26 is in communication with the manual transmission hole 2213, and a low (bottom) face of the recessed portion 26 configures an upper face of the vehicle right side wall of the strength gate 20.

At the strength gate 20, an opposing portion 28 is provided on the opposite side of the manual transmission hole 22B to the peninsular portion 24. A front face (upper face) and a back face (lower face) of the opposing portion 28 respectively configure an upper face and a lower face of the vehicle right side wall of the strength gate 20. The opposing portion 28 is disposed (positioned) at the back side (lower side) with respect to the peninsular portion 24, with the front face of the opposing portion 28 being disposed (positioned) at the back side with respect to the back face (lower face) of the peninsular portion 24.

Explanation follows regarding operation of the present exemplary embodiment.

In the shift lever device 10 configured as described above, the automatic transmission hole 22A, the manual transmission hole 22B and the communication hole 22C are provided to the shift hole 22 of the strength gate 20. The shift position of the shift lever 18 is changed through the "P" position, the "R" position, the "N" position, and the "D" position by turning the shift lever 18 along the automatic transmission hole 22A. Moreover, the shift position of the shift lever 18 is changed through the "M" position, the "+" position, and the "−" position by turning the shift lever 18 along from the automatic transmission hole 22A to the communication hole 22C, and then along the manual transmission hole 22B.

Note that at the strength gate 20, the recessed portion 26 is formed that communicates with the manual transmission hole 22B, thereby disposing the peninsular portion 24 being at the front side (upper side) with respect to the opposing portion 28. A reduction in the size of the peninsular portion 24 and the opposing portion 28 along the vehicle left-right direction can accordingly be suppressed even if the strength gate 20 is reduced in size along the vehicle left-right direction (the direction along the communication hole 22C, the plane direction of the upper wall of the strength gate 20), which case is different from a case in which the recessed portion 26 is not formed at the strength gate 20 so the position of the peninsular portion 24 matches the position of the opposing portion 28 in the front-back direction (up-down direction). A reduction in the strength of the peninsular portion 24 and the opposing portion 28 can be suppressed, and the peninsular portion 24 and the opposing portion 28 can efficiently restrict turning of the shift lever 18. A reduction in size can also be achieved for the strength gate 20 along the vehicle left-right direction.

Moreover, in the strength gate 20, the back face (lower face) of the peninsular portion 24 is disposed at the front side with respect to the front face (upper face) of the opposing portion 28. A reduction in the size of the peninsular portion 24 and the opposing portion 28 along the vehicle left-right direction can accordingly be efficiently suppressed even if the strength gate 20 is reduced in size along the vehicle left-right direction. A reduction in the strength of the peninsular portion 24 and the opposing portion 28 can accordingly be suppressed, so the peninsular portion 24 and the opposing portion 28 can restrict turning of the shift lever 18 even more efficiently. A reduction in size can also be achieved for the strength gate 20 along the vehicle left-right direction.

Second Exemplary Embodiment

Figure 4:
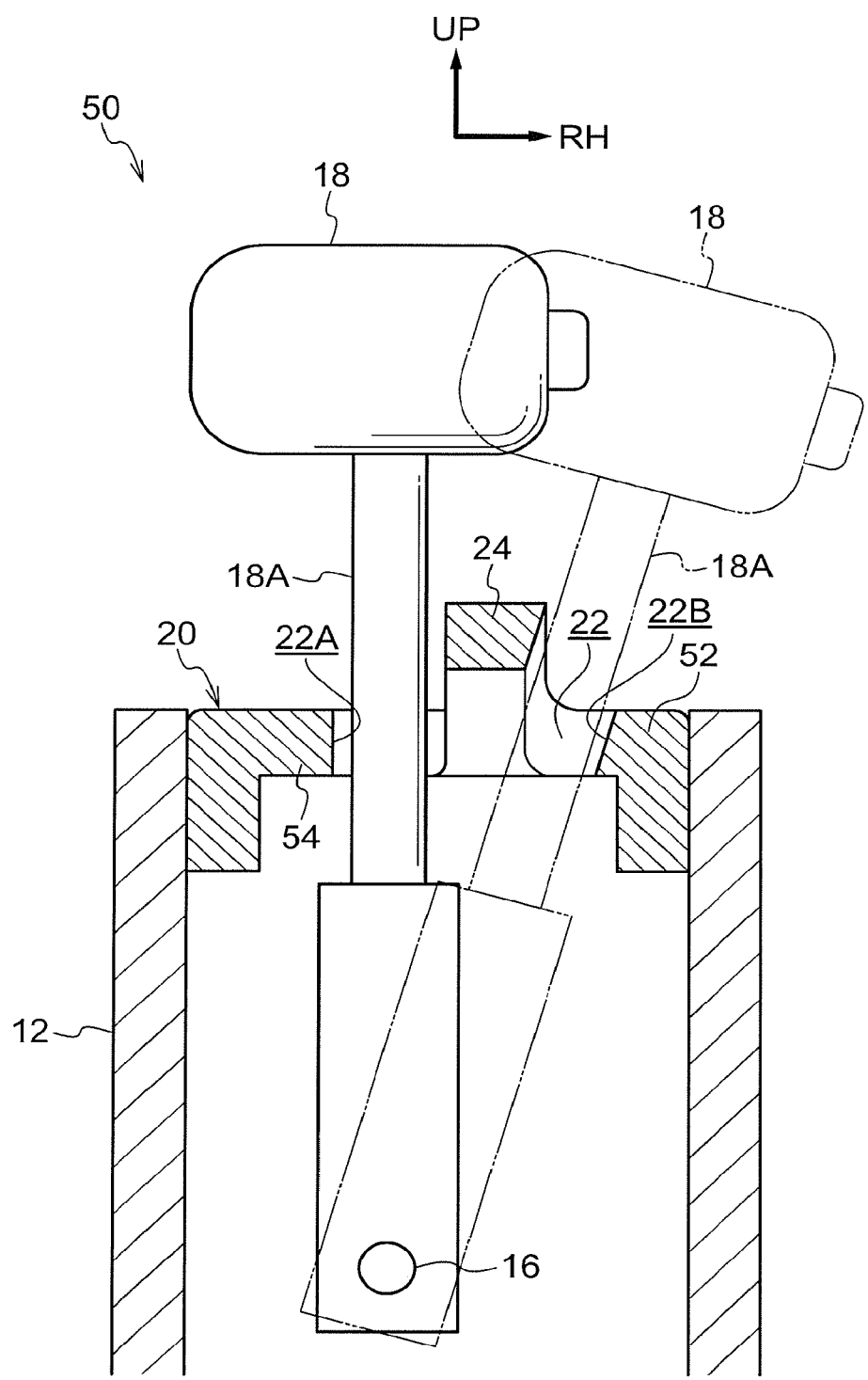
FIG. 4 is a cross-section illustrating a shift lever device according to a second exemplary embodiment of the present invention, as viewed from the vehicle rear.

FIG. 4 is a cross-section illustrating a shift lever device 50 serving as a shift lever device according to a second exemplary embodiment of the present invention, as viewed from the vehicle rear side. FIG. 5 is a perspective view illustrating a strength gate 20 of the shift lever device 50, as viewed from the diagonal rear left of the vehicle.

The shift lever device 50 of the present exemplary embodiment has substantially the same configuration as in the first exemplary embodiment, however differs in the following points.

As illustrated in FIG. 4 and FIG. 5, in the shift lever device 50 of the present exemplary embodiment, the recessed portion 26 and the opposing portion 28 of the first exemplary embodiment described above are not provided at the strength gate 20.

An upper wall of the strength gate 20 in the vicinity of the vehicle right side of the automatic transmission hole 22A (including the peninsular portion 24) is inclined in a direction rising towards the upper side on progression towards the vehicle rear side.

A right opposing portion 52 serving as an opposing portion is provided at the strength gate 20 on the opposite side of the manual transmission hole 22B to the peninsular portion 24. The right opposing portion 52 is disposed (positioned) to the back side (lower side) with respect to the peninsular portion 24, and a front face (upper face) of the right opposing portion 52 is disposed (positioned) at the back side with respect to a back face (lower face) of the peninsular portion 24.

A left opposing portion 54 serving as an opposing portion is provided at the strength gate 20 on the opposite side of the automatic transmission hole 22A to the peninsular portion 24. The left opposing portion 54 is disposed (positioned) at the back side (lower side) with respect to the peninsular portion 24, and a front face (upper face) of the left opposing portion 54 is disposed (positioned) at the back side with respect to the back face (lower face) of the peninsular portion 24.

A rear opposing portion 56 serving as an opposing portion is provided at the strength gate 20 on the opposite side of the communication hole 22C to the peninsular portion 24. The rear opposing portion 56 is disposed (positioned) at the back face side (lower side) with respect to the peninsular portion 24, and a front face (upper face) of the rear opposing portion 56 is disposed (positioned) at the back side with respect to the back face (lower face) of the peninsular portion 24.

Note that the present exemplary embodiment enables similar operation and advantageous effects to be exhibited to those of the first exemplary embodiment described above.

In particular, in the strength gate 20, the peninsular portion 24 is disposed at the front side (upper side) with respect to the right opposing portion 52, the left opposing portion 54, and the rear opposing portion 56.

A reduction in the size of the peninsular portion 24, the right opposing portion 52 and the left opposing portion 54 along the vehicle left-right direction can accordingly be suppressed even if the strength gate 20 is reduced in size along the vehicle left-right direction (along the direction of the communication hole 22C, the plane direction of the upper wall of the strength gate 20), which case is different from a case in which the position of the peninsular portion 24 matches the positions of the right opposing portion 52 and the left opposing portion 54 in the front-back direction (up-down direction). A reduction in the strength of the peninsular portion 24, the right opposing portion 52 and the left opposing portion 54 can be suppressed, enabling the peninsular portion 24, the right opposing portion 52, and the left opposing portion 54 to efficiently restrict turning of the shift lever 18. A reduction in size can also be achieved for the strength gate 20 along the vehicle left-right direction.

Moreover, a reduction in the size of the peninsular portion 24 and the rear opposing portion 56 along the vehicle front-rear direction can be suppressed even if the strength gate 20 is reduced in size along the vehicle front-rear direction (the direction along the automatic transmission hole 22A and the manual transmission hole 22B, the plane direction of the upper wall of the strength gate 20), which case is different from a case in which the position of the peninsular portion 24 matches the position of the rear opposing portion 56 along the front-back direction (up-down direction). A reduction in the strength of the peninsular portion 24 and the rear opposing portion 56 can accordingly be suppressed, thereby enabling the peninsular portion 24 and the rear opposing portion 56 to efficiently restrict turning of the shift lever 18. A reduction in size can also be achieved for the strength gate 20 along the vehicle front-rear direction.

Moreover, in the strength gate 20, the back face (lower face) of the peninsular portion 24 is disposed at the front side with respect to the front faces (upper faces) of the right opposing portion 52, the left opposing portion 54, and the rear opposing portion 56.

A reduction in the size of the peninsular portion 24, the right opposing portion 52 and the left opposing portion 54 along the vehicle left-right direction can accordingly be efficiently suppressed even if the strength gate 20 is reduced in size along the vehicle left-right direction. A reduction in the strength of the peninsular portion 24, the right opposing portion 52 and the left opposing portion 54 can accordingly be efficiently suppressed, enabling the peninsular portion 24, the right opposing portion 52 and the left opposing portion 54 restrict turning of the shift lever 18 to even more efficiently. A reduction in size can also be efficiently achieved for the strength gate 20 along the vehicle left-right direction.

Moreover, a reduction in the size of the peninsular portion 24 and the rear opposing portion 56 along the vehicle front-rear direction can be efficiently suppressed even if the strength gate 20 is reduced in size along the vehicle front-rear direction. A reduction in the strength of the peninsular portion 24 and the rear opposing portion 56 can accordingly be efficiently suppressed, enabling the peninsular portion 24 and the rear opposing portion 56 to restrict turning of the shift lever 18 even more efficiently. A reduction in size can also be achieved for the strength gate 20 along the vehicle front-rear direction.

Note that in the first exemplary embodiment and the second exemplary embodiment described above, the back face of the peninsular portion 24 is disposed at the front side with respect to the front faces of the opposing portion 28, the right opposing portion 52, the left opposing portion 54, and the rear opposing portion 56. However, configuration may be made such that the front face of the peninsular portion 24 is disposed at the front side with respect to the front faces of the opposing portion 28, the right opposing portion 52, the left opposing portion 54 and the rear opposing portion 56. Moreover, configuration may be made such that the back face of the peninsular portion 24 is disposed at the front side with respect to the back faces of the opposing portion 28, the right opposing portion 52, the left opposing portion 54 and the rear opposing portion 56.

Moreover, in the first exemplary embodiment and the second exemplary embodiment described above, the peripheral face of the shift hole 22 is disposed so as to be parallel to the shaft direction of the lever 18A when the lever 18A of the shift lever 18 is facing the peripheral face of the shift hole 22. However, configuration does not have to be made such that the peripheral face of the shift hole 22 is disposed so as to be parallel to the shaft direction of the lever 18A when the lever 18A of the shift lever 18 is facing the peripheral face. In particular, in such cases configuration may be made such that only the front face, or the back face, of the peninsular portion 24 is disposed at the front side with respect to the front face, or the back face, of the opposing portion 28, the right opposing portion 52, the left opposing portion 54 or the rear opposing portion 56.

In the first exemplary embodiment and the second exemplary embodiment described above, the upper wall of the strength gate 20 is configured in a flat plate shape. However, the upper wall of the strength gate 20 may for example be configured in a curved plate shape, similarly to as in JP-A No. 2005-119382 described above.

In the first exemplary embodiment and the second exemplary embodiment described above, the shift lever device 10 and 50 is configured as what is referred to as a straight type, with the automatic transmission hole 22A extending in the vehicle front-rear direction only. However, shift lever device 10 and 50 may be configured as what is referred to as a gate type, with the automatic transmission hole 22A extending in both the vehicle front-rear direction and the vehicle left-right direction, similarly to as in JP-A No. 2005-119382 described above.

Moreover, in the first exemplary embodiment and the second exemplary embodiment described above, the shift position of the shift lever 18 changes through the "+" position, the "M" position, and the "–" position in sequence from the vehicle front side towards the vehicle rear side when the shift lever 18 is turned along the manual transmission hole 22B. However, configuration may be made wherein the shift position of the shift lever 18 changes through the "–" position, the "M" position, and the "+" position in sequence from the vehicle front side towards the vehicle rear side when the shift lever 18 is turned along the manual transmission hole 22B.

In the first exemplary embodiment and the second exemplary embodiment described above, the vehicle is configured as a right hand drive vehicle, with the manual transmission hole 22B disposed to the vehicle right side with respect to the automatic transmission hole 22A in the shift hole 22. However, when configuration is made with a left hand drive vehicle, the shift lever device 10 and 50 is reversed in the vehicle left-right direction, for example with the manual transmission hole 22B being disposed on the vehicle left side with respect to the automatic transmission hole 22A in the shift hole 22.

In the first exemplary embodiment and the second exemplary embodiment described above, the floor type shift lever device 10 and 50 is installed to the floor portion of the vehicle compartment. However, the shift lever device 10 and 50 may also be installed to a steering column or to an instrument panel of the vehicle.

What is claimed is:

1. A shift device for a vehicle comprising:
   a body including an opening between an inside and an outside of the body;
   a shift member that is turned to change a shift position of the vehicle, the shift position including a reverse position, a neutral position and a drive position, the shift member being connected to a center of turning disposed inside the body;
   a restriction member that is provided over the opening of the body so as to cover the opening, and in which a shift hole is provided, the shift member being inserted through the shift hole so as to be capable of turning, a peripheral edge of the shift hole restricting turning of the shift member along a predetermined path, and the shift hole including a pair of first holes and a second hole that communicates the pair of first holes, the shift member being inserted through the pair of first holes and the second hole so as to be capable of turning;
   the restriction member being provided with an adjacent portion that, in a plan view along a direction from the outside to the inside of the body via the restriction member, is disposed between the pair of first holes and is adjacent to the pair of first holes and to the second hole; and
   the restriction member further being provided with an opposing portion that is offset along the direction from the outside of the body to the inside of the body via the restriction member from the adjacent portion, and that is disposed at an opposite side of one of the pair of first holes and from the adjacent portion in the plan view
   wherein the center of turning includes a dual pivot joint pivotable along two axes such that the shift member is capable of turning along the pair of first holes and the second hole, the adjacent portion has a first face positioned at a first side of the adjacent portion facing the opening and a second face positioned at a second side of the adjacent portion opposite the opening, and the opposing portion has a first face positioned at the first side of the opposing portion and a second face positioned at the second side of the opposing portion opposite the opening, and
   the first face positioned at a first side of the adjacent portion is disposed at the second side with respect to the second face of the opposing portion.

2. The shift device of claim 1, wherein the shift member is turned to change the shift position relating to a state of the vehicle.

* * * * *